(No Model.)
J. SCHMIDT & J. WEITZEL.
SHEET METAL PIPE.
No. 525,061. Patented Aug. 28, 1894.
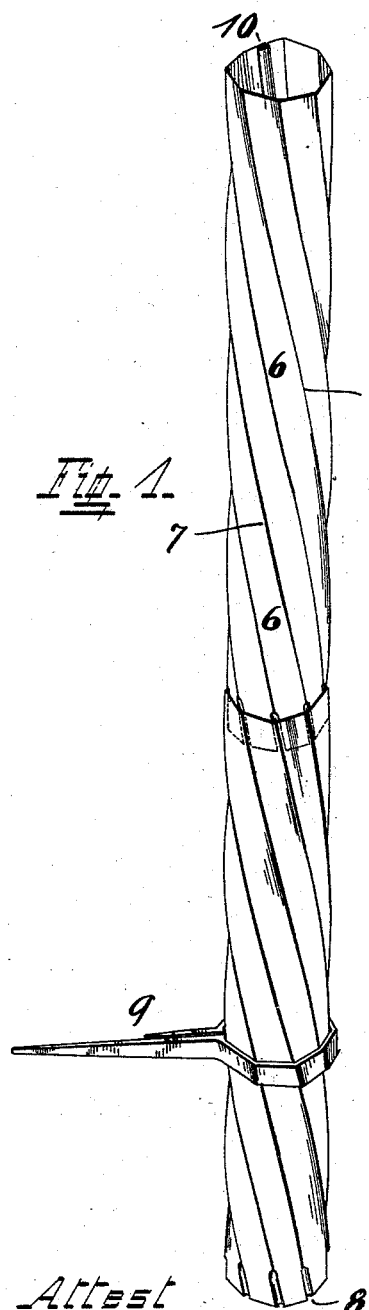
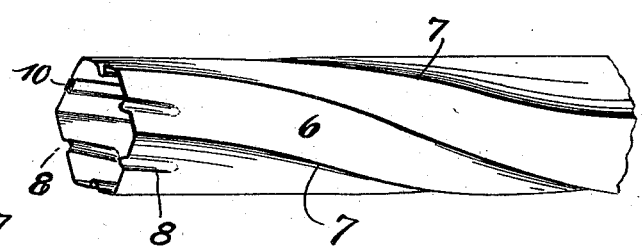
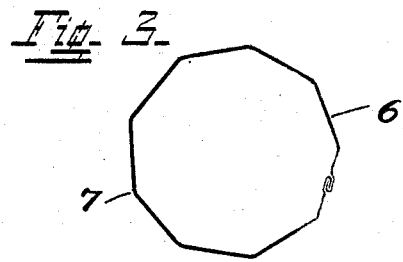
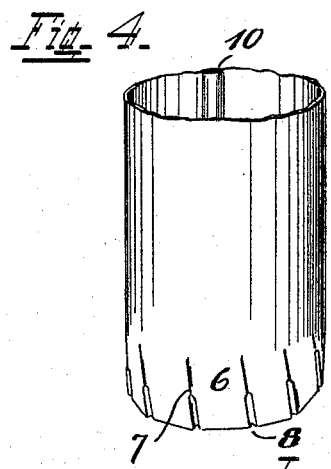

UNITED STATES PATENT OFFICE.

JULIUS SCHMIDT AND JACOB WEITZEL, OF LUDLOW, KENTUCKY.

SHEET-METAL PIPE.

SPECIFICATION forming part of Letters Patent No. 525,061, dated August 28, 1894.

Application filed October 20, 1893. Serial No. 488,688. (No model.)

*To all whom it may concern:*

Be it known that we, JULIUS SCHMIDT and JACOB WEITZEL, citizens of the United States, and residents of Ludlow, Kenton county, State of Kentucky, have invented a certain new and useful Sheet-Metal-Pipe Construction; and we do declare the following to be a full, clear, and exact description of the invention, such as will enable others skilled in the art to which it appertains to make and use the same, attention being called to the accompanying drawings, with the reference-numerals marked thereon, which form a part of this specification.

This invention relates to improvements in the construction of sheet-metal pipes for all purposes such as pipes for conductors or down-spouts, exhaust-pipes and in heating, ventilating, or dust collecting-systems.

The objection with such pipes, especially when of considerable length is that they lack sufficient stiffness to prevent them from sagging down, particularly when charged with water which increases the weight. We intend to strengthen such pipes without the use of additional metal or other means and merely by shaping them in a novel and peculiar manner heretofore never attempted in such connection and for such purpose. This novel manner in shaping such pipes consists substantially of making them polygonal in cross-section instead of round, that is square, hexagonal, octagonal or any other suitable number of sides, after which the pipes are twisted so that the pointed corners thereon assume a spiral shape.

In the following specification is found a full description of our invention, the same being also particularly pointed out in the claim at the end thereof and its construction illustrated in the accompanying drawings, in which—

Figure 1, shows a length of such a pipe of octagonal cross-section, joined together and used for a down-spout on the exterior of a building. Fig. 2, shows a portion of such a pipe of hexagonal shape and in a horizontal position. Fig. 3, shows a cross-section of such a pipe with nine corners. Fig. 4, shows a modified construction of the end of a pipe.

6, are the sides of the pipe, and 7, the corners between them formed by the junction of said sides. These corners are twisted longitudinally to a spiral shape as shown. At one end of each length of pipe are provided a number of crimps 8, preferably at the corners and in line with them which is done for the purpose of reducing the size or diameter at this one end to permit the other end of the next length to slip readily over it when to be joined together.

9 in Fig. 1, represents a suitable fastening or hook whereby the pipes when used as a down-spout are secured to the wall of a building.

Another feature of our invention consists of the manner of joining such pipes together. Instead of being stuck straight into each other, they have to be joined by a screw-motion owing to the screw-shape of the twisted sides and corners. It results therefrom that the pipes cannot part without going through a similar motion under a reverse turn. If they are however prevented from such turning by a close fitting fastener as shown in Fig. 1, their separation becomes practically impossible and one pipe holds the other in place. This prevents the objectionable parting of the joints in down-spouts which occurs so frequently, especially in winter when filled with ice which causes them to slip apart under the increased weight. This particular manner of joining the ends of such sheet-metal pipes might also be employed where they are round and in which case only their slip-end would have the spiral-shaped corners or sides as shown in Fig. 4. The construction of these pipes as far as their longitudinal junction or seam is concerned may be accomplished by any of the customary methods which is usually by a lock-seam as shown at 10. The strength of such a seam is however increased by the twist of the sides which holds it joined and prevents it from opening. The polygonal shape also permits a sufficient degree of expansion to prevent the pipe from bursting when frozen.

We are aware of a twisted pipe shown in Patent No. 356,888, where the sides are joined by a semi-circular bead, which allows a movement of the edges of the sides, from or toward each other for the purpose of contracting, or expanding the pipe. While such may be an object in some cases in view of a certain purpose, it is not so here, because it renders the pipe less stiff, whereas we wish to attain the greatest resistance possible, which we do by joining the sides directly to each other and without any beads between them. In view of the above patent however we disclaim any of the general features shown therein.

Having described our invention, we claim as new—

A sheet-metal pipe of polygonal cross-section with its sides and corners twisted longitudinally to a spiral shape, and having its slip-end provided with crimps starting inwardly from the end, parallel with each other and also parallel with the spirally twisted corners as shown and for the purpose described.

In testimony whereof we affix our signatures in presence of two witnesses.

JULIUS SCHMIDT.
JACOB WEITZEL.

Witnesses:
C. SPENGEL,
WM. KRAMER.